（12） United States Patent
Hsu

(10) Patent No.: US 8,246,258 B2
(45) Date of Patent: Aug. 21, 2012

(54) MECHANICAL SHUTTER WITH SHAPE MEMORY ELEMENT

(75) Inventor: Hsueh-Feng Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 122 days.

(21) Appl. No.: 12/825,353

(22) Filed: Jun. 29, 2010

(65) Prior Publication Data

US 2011/0314742 A1    Dec. 29, 2011

(30) Foreign Application Priority Data

Jun. 25, 2010 (TW) .............................. 99120720 A

(51) Int. Cl.
   *G03B 9/08* (2006.01)
(52) U.S. Cl. ......................... 396/452; 396/463
(58) Field of Classification Search ................... 60/527; 396/1–650
   See application file for complete search history.

(56) References Cited

U.S. PATENT DOCUMENTS

| | | | | |
|---|---|---|---|---|
| 3,883,885 A * | 5/1975 | Orlando | .......................... | 396/496 |
| 4,696,560 A * | 9/1987 | Ogihara et al. | ................ | 396/250 |
| 4,777,394 A * | 10/1988 | Hayashi | .......................... | 310/83 |
| 5,017,954 A * | 5/1991 | Harvey | .......................... | 396/493 |
| 5,061,914 A * | 10/1991 | Busch et al. | ................... | 337/140 |
| 5,264,896 A * | 11/1993 | Lee et al. | ...................... | 396/235 |
| 6,449,436 B1 * | 9/2002 | Fuss | .............................. | 396/208 |
| 6,554,501 B2 * | 4/2003 | Kosaka et al. | ................. | 396/452 |
| 6,614,570 B2 * | 9/2003 | Johnson et al. | ................ | 359/230 |
| 6,832,477 B2 * | 12/2004 | Gummin et al. | ................. | 60/527 |
| 7,021,055 B2 * | 4/2006 | Gummin et al. | ................. | 60/527 |
| 7,242,123 B2 * | 7/2007 | Miyawaki | ................ | 310/156.32 |
| 7,410,310 B2 * | 8/2008 | Kihara | .......................... | 396/463 |
| 7,699,543 B2 * | 4/2010 | Wernersson | ................... | 396/448 |
| 7,976,230 B2 * | 7/2011 | Ryynanen et al. | ............ | 396/463 |
| 2002/0071167 A1 * | 6/2002 | Johnson et al. | ................ | 359/230 |
| 2004/0170423 A1 * | 9/2004 | Kudo et al. | ..................... | 396/484 |
| 2006/0048511 A1 * | 3/2006 | Everson et al. | .................. | 60/527 |
| 2007/0242949 A1 * | 10/2007 | Ryynanen et al. | ............ | 396/463 |
| 2010/0196001 A1 * | 8/2010 | Ryynanen et al. | ............ | 396/493 |
| 2011/0217033 A1 * | 9/2011 | Hsu | ............................. | 396/497 |
| 2011/0314742 A1 * | 12/2011 | Hsu | ................................. | 49/358 |

OTHER PUBLICATIONS

R. Ghodssi, P. Lin (eds.), MEMS Materials and Processes Handbook, 355 MEMS Reference Shelf, DOI 10.1007/978-0-387-47318-5_6, Springer Science+Business Media, LLC 2011 (refer chapter 6).*

* cited by examiner

*Primary Examiner* — Clayton E Laballe
*Assistant Examiner* — Kevin Butler
(74) *Attorney, Agent, or Firm* — Altis Law Group, Inc.

(57) ABSTRACT

An exemplary mechanical shutter includes a base with a through hole defined therein, a blade arranged on the base, two shape memory alloy units, and a control unit. Each of the two shape memory alloy units includes a first end and a opposite second end. The first end of the shape memory alloy element is attached to the base, and the second end is attached to the blade. The control unit is configured for controlling the two shape memory alloy units to selectively deform into a first shape, or into a second shape. In particular, the two shape memory alloy units each straighten to a first shape (straight shape) and move the blade to cover the through hole. In addition, the two shape memory alloy units each deform to a second shape (spring coil shape) and thus move the blade away from the through hole to expose the through hole.

7 Claims, 4 Drawing Sheets

MECHANICAL SHUTTER WITH SHAPE MEMORY ELEMENT

BACKGROUND

1. Technical Field

The disclosure generally relates to mechanical shutters, and particularly, to a small mechanical shutter.

2. Description of Related Art

A typical mechanical shutter includes a motor, a drive shaft, and a spring. It is, however, difficult to reduce the size of such mechanical shutters.

Therefore, what is needed is a mechanical shutter that can overcome the described limitations.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present mechanical shutter. Moreover, in the drawings, all the views are schematic, and like reference numerals designate corresponding parts throughout the several views.

DETAILED DESCRIPTION

Embodiments of the mechanical shutter will now be described in detail below and with reference to the drawings.

Figure 1:
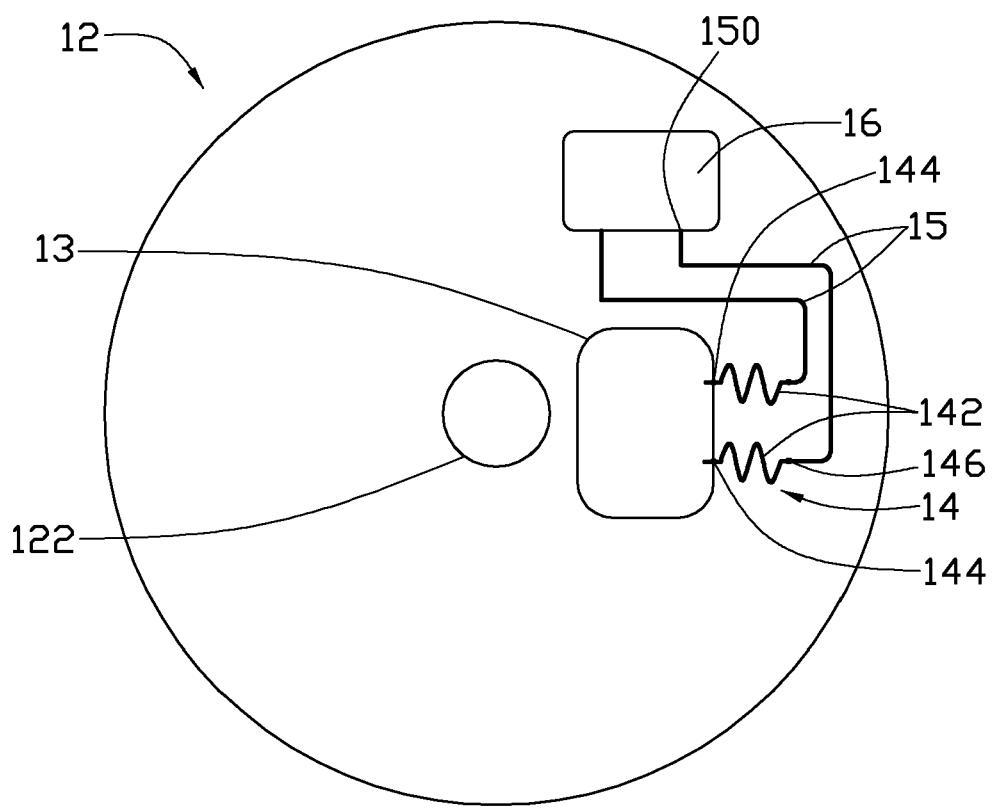
FIG. 1 is a top plan view of a mechanical shutter in accordance with a first embodiment, showing an aperture of the mechanical shutter.

Referring to FIG. 1, a mechanical shutter 10 in accordance with a first embodiment is shown. The mechanical shutter 10 includes a base 12, a blade 13, two shape memory alloy (SMA) units 14, two metallic wires 15, and a control unit 16.

In this embodiment, the base 12 is generally round when viewed from above, and has a through hole, for example an aperture 122 defined in a central portion thereof. The aperture 122 is generally round. In alternative embodiments, the base 12 may be some other shape such as generally rectangular as viewed from above.

The blade 13 is arranged on the base 12, and is used to cover or expose the aperture 122. In this embodiment, the blade 13 is generally rectangular and parallel to the base 12, and the blade 13 includes four corners (not labeled) which are generally arc-shaped. A surface area of the blade 13 is greater than an area of the aperture 122.

The two SMA units 14 are used to move the blade 13 to cover or expose the aperture 122. In this embodiment, each of the SMA units 14 includes a SMA wire 142, and a metallic layer (not shown) for example, coated on an exterior surface of the SMA wire 142. The two SMA wires 142 are connected to the two respective metallic wires 15. In particular, one end, for example a first end of the SMA wire 142 is connected to one end of the metallic wire 15. The other end 144, for example a second end of the SMA wire 142 opposite to a connecting point 146 is attached to a peripheral side of the blade 13 by, for example, gluing or welding. The connecting point 146 of the SMA wire 142 and the metallic wire 15 are attached to the base 12. The SMA wire 142 has a pre-trained shape that it deforms when heated above a certain temperature. In this embodiment, the SMA wire 142 is spring coil shape at room temperature. When heat is applied and the temperature of the SMA wire 142 increases to a predetermined point, the SMA wire 142 straightens and extends in a direction facing away from the connecting point 146.

The material of the SMA wire 142 is one of Ti—Ni alloy, copper (Cu) based SMA, such as Cu—Zn—Al alloy, Cu—Zn—Ca alloy, Cu—Al—Ni alloy, Cu—Al—Be alloy, Cu—Al—Mu alloy, Cu—Zn—Si alloy, and Cu—Al—Te alloy; or an iron (Fe) based SMA, such as Fe—Pt alloy, Fe—Pd alloy, Fe—Cr—Ni alloy, Fe—Ni—C alloy, Fe—Mn alloy, Fe-33Ni-10Co-4Ti alloy, Fe-32Mn-6Si alloy, Fe-28Mn-6Si-5Cr alloy, Fe—Cr—Ni—Co—Mn—Si alloy, or Fe—Cr—Ni—Mn—Si alloy. The metallic layer on the SMA wire 142 can be made of metallic material with high temperature resistance and low specific heat capacity, such as tin, nickel, or zinc.

The control unit 16 is used to heat the SMA wires 142. In this embodiment, the control unit 16 is a circuit board arranged on a peripheral portion of the base 12. Each of the two metallic wires 15 is bent, and includes an end 150 facing away from the connecting point 146. The ends 150 of the metallic wires 15 are electrically connected to the control unit 16. The control unit 16 can apply an electric current to the metallic layers on the SMA wires 142 through the metallic wires 15.

Figure 2:
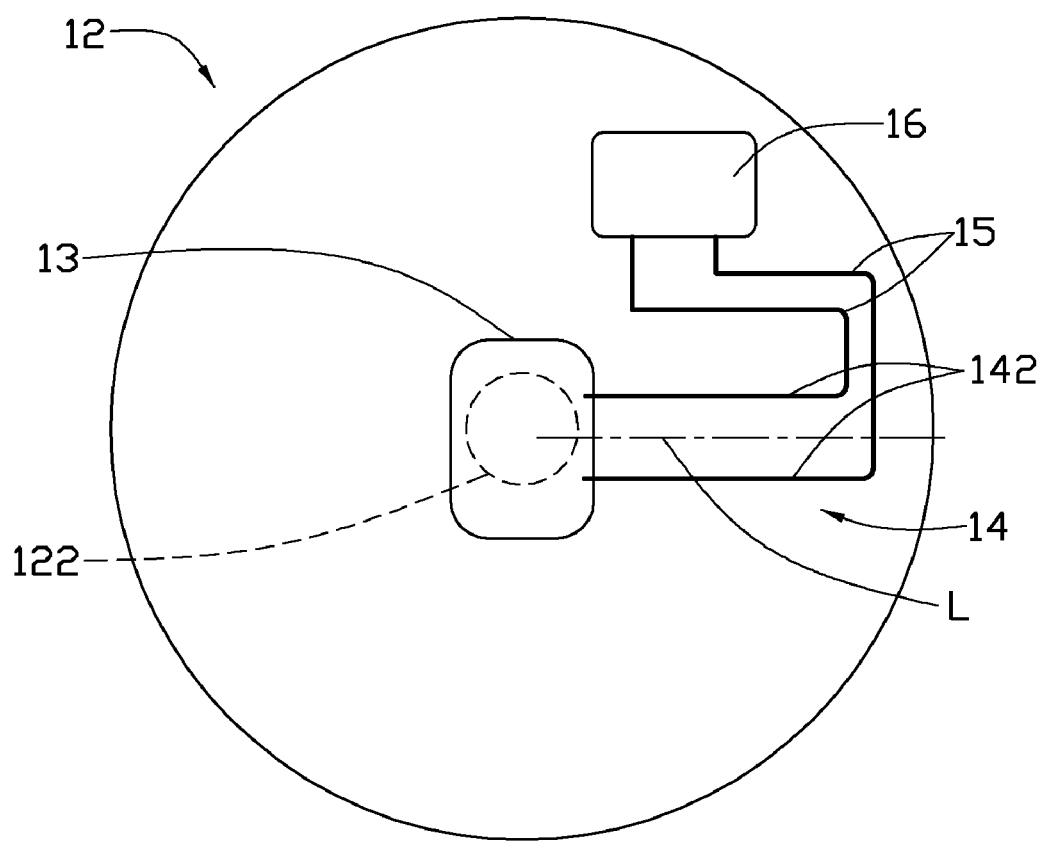
FIG. 2 is a top plan view of the mechanical shutter of FIG. 1, showing the aperture covered by a blade of the mechanical shutter.

Referring also to FIG. 2, in operation, an electric current is applied to the metallic layers on the SMA wires 142 by the control unit 16. The metallic layers generate heat. The heat is transmitted to the SMA wires 142. In one typical application, when the heat of the SMA wires 142 reaches or exceeds the point of Martensitic transformation, the SMA wires 142 straighten from spring coil shape to straight shape. Accordingly, the SMA wires 142 move the blade 13 to an extended position, where it covers the aperture 122 (see FIG. 2). When no electric current is applied to the metallic layers on the SMA wires 142, the heat of the SMA wires 142 falls below the point of Martensitic transformation, causing the SMA wires 142 to assume their spring coil shape, and causing the blade 13 to retract, thus exposing the aperture 122.

In this embodiment, the two SMA units 14 are arranged symmetrically opposite to each other across a central axis L of the aperture 122 to ensure the SMA wires 142 move the blade 13 to cover or expose the aperture 122.

One advantage of the shutter 10 is that the SMA wires 142 and the metallic wires 15 are very small and so the shutter 10 can be relatively smaller.

It is noted, the number of the SMA units 14 is not limited to the above illustrated embodiment. The shutter 10 including only one SMA units 14, or more than two SMA units 14 should also be considered to be within the scope of the disclosure. In addition, in alternative embodiments, the control unit 16 may be arranged adjacent to the base 12 and not necessarily arranged on the base 12.

Figure 3:
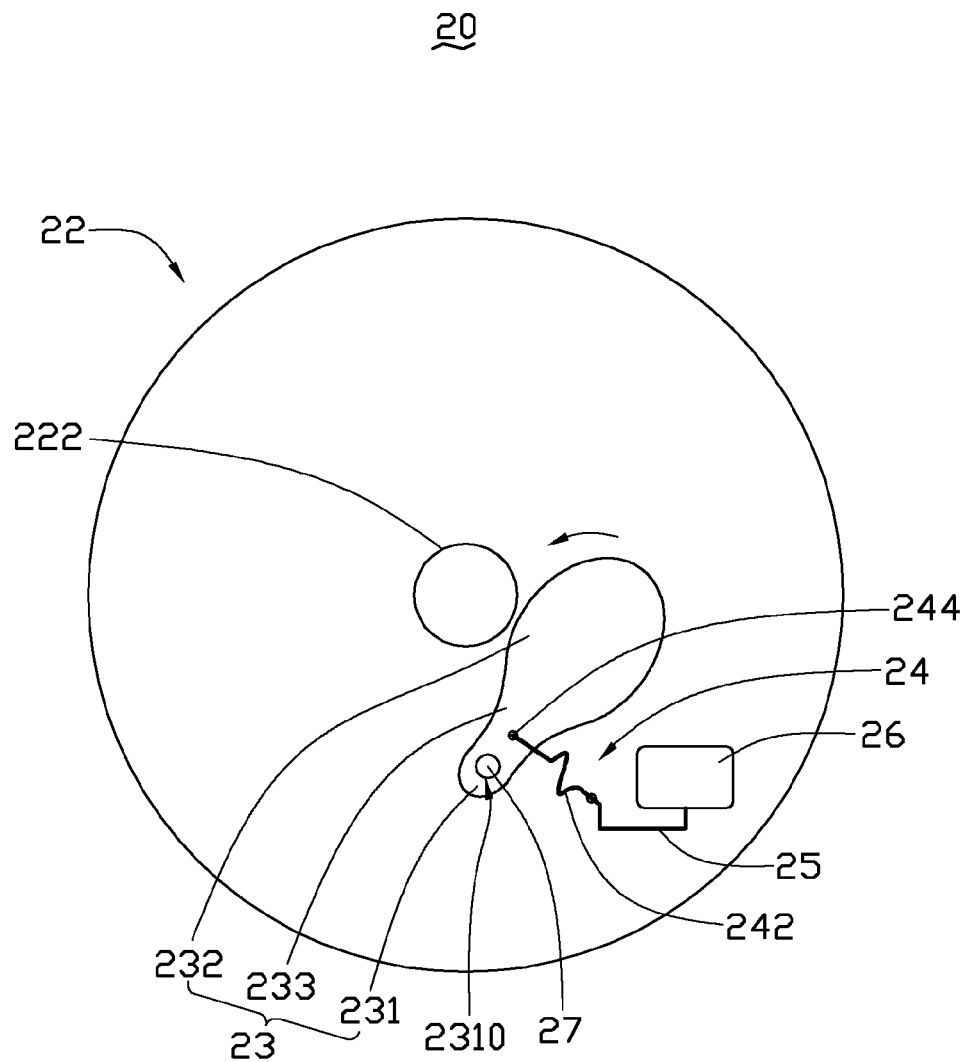
FIG. 3 is a top plan view of a mechanical shutter in accordance with a second embodiment, showing an aperture of the mechanical shutter t uncovered.
Figure 4:
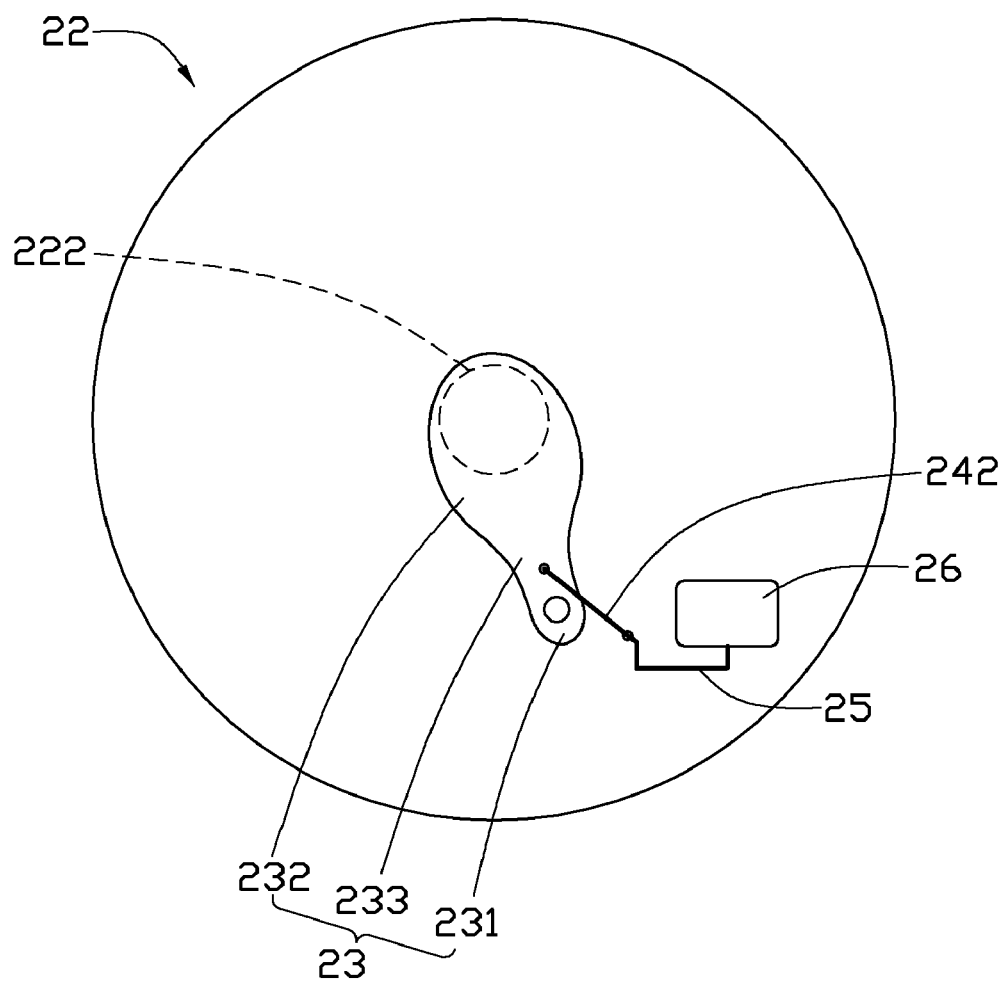
FIG. 4 is a top plan view of the mechanical shutter of FIG. 3, showing the aperture covered by a blade of the mechanical shutter.

Referring to FIGS. 3-4, a mechanical shutter 20 in accordance with a second embodiment is shown. The shutter 20 is similar to the shutter 10 of the first embodiment in principle, and includes a base 22 defining an aperture 222, a blade 23, a SMA element 24, a metallic wire 25, and a control unit 26. However, the blade 23 is different from the blade 13 in structure, and includes a rotary portion 231, a light shielding portion 232, and a connecting portion 233. The connecting portion 233 is located between and connected to the rotary portion 231 and the light shielding portion 232. The rotary portion 231 has a through hole 2310 defined therein. In addition, the shutter 20 further includes a positioning projection 27 protruding from the base 22. In this embodiment, the positioning projection 27 is generally cylindrical, and is located adjacent to the aperture 222. The rotary portion 231 is arranged around the positioning projection 27 to receive the positioning projection 27 in the through hole 2310. Such that the rotary portion 231 is pivotedly coupled to the positioning projection 27.

In this embodiment, the light shielding portion 232 is generally round. The shutter 20 includes only one SMA element 24 and only one metallic wire 25. The SMA element 24 includes a SMA wire 242 and a metallic layer on an exterior surface of the SMA wire 242. The SMA wire 242 includes one end 244 attached to the connecting portion 233. In one typical example, when an electric current is applied to the metallic layer, the SMA wire 242 extends and rotates the rotary portion 231 around to the positioning projection 27 in a counter-clockwise direction (from the perspective of FIG. 3). The counter-clockwise rotation of the rotary portion 231 moves the light shielding portion 232 through the connecting portion 233 to cover the aperture 222, as shown in FIG. 4. In another example, when there is no electric current applied to the metallic layer, the SMA wire 242 impels the rotary portion 231 to rotate clockwise. The clockwise rotation of the rotary portion 231 moves the light shielding portion 232 to expose the aperture 222.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A mechanical shutter, comprising:
    a base with a through hole defined therein;
    a blade arranged on the base;
    a shape memory alloy element comprising a first end attached to the base, and an opposite second end attached to the blade; and
    a control unit configured for controlling the shape memory alloy element to selectively deform into a pre-trained straight shape where the shape memory alloy element moves the blade to cover the through hole by heating the shape memory alloy element above a predetermined temperature, or into a coil spring shape where the shape memory alloy element moves the blade away from the through hole thus exposing the through hole when the temperature of the shape memory alloy is below the predetermined temperature;
    wherein the shape memory alloy element comprises two shape memory alloy units, the two shape memory alloy units are arranged symmetrically opposite to each other across an imaginary axis, which passes through a center of the through hole, and the two shape memory alloy units are in the pre-trained straight shape at the same time when moving the blade to cover the through hole and in the coil spring shape at the same time when moving the blade away from the through hole.

2. The mechanical shutter of claim 1, wherein each of the shape memory alloy units comprises a shape memory wire and a metallic layer formed on an exterior surface of the shape memory wire, and the control unit is configured for applying an electric current to the metallic layer to heat the metallic layer.

3. The mechanical shutter of claim 2, further comprising a metallic wire, one end of the metallic wire being mechanically connected to the first end of the shape memory wire, the other end of the metallic wire being electrically connected to the control unit, the control unit configured for applying the electric current to the metallic layer via the metallic wire.

4. The mechanical shutter of claim 2, wherein a material of the shape memory wire is selected from the group consisting of Ti—Ni alloy, copper based shape memory alloy, and iron based shape memory alloy.

5. The mechanical shutter of claim 2, wherein a material of the metallic layer is selected from the group consisting of tin, nickel, and zinc.

6. The mechanical shutter of claim 2, wherein the control unit comprises a circuit board.

7. The mechanical shutter of claim 1, wherein the blade is generally rectangular.

* * * * *